(12) United States Patent
Stienhans (10) Patent No.: US 7,895,572 B2
(45) Date of Patent: Feb. 22, 2011

(54) SYSTEMS AND METHODS FOR ENTERPRISE SOFTWARE MANAGEMENT

(75) Inventor: Frank Stienhans, Mannheim (DE)

(73) Assignee: SAP Aktiengesellschaft, Walldorf (DE)

( * ) Notice: Subject to any disclaimer, the term of this patent is extended or adjusted under 35 U.S.C. 154(b) by 1110 days.

(21) Appl. No.: 11/203,112

(22) Filed: Aug. 15, 2005

(65) Prior Publication Data

US 2007/0038983 A1 Feb. 15, 2007

(51) Int. Cl.
 *G06F 9/44* (2006.01)
(52) U.S. Cl. ...................................................... 717/120
(58) Field of Classification Search ................. 717/101, 717/102, 103, 120–122, 123, 126, 127, 131, 717/132, 133, 134, 135
See application file for complete search history.

(56) References Cited

U.S. PATENT DOCUMENTS

| 5,758,160 | A | * | 5/1998 | McInerney et al. ........... 717/104 |
| 6,240,416 | B1 | * | 5/2001 | Immon et al. ................. 707/10 |
| 6,269,475 | B1 | * | 7/2001 | Farrell et al. ................. 717/113 |
| 6,871,344 | B2 | * | 3/2005 | Grier et al. .................... 717/162 |
| 7,055,130 | B2 | * | 5/2006 | Charisius et al. ............. 717/108 |
| 7,076,784 | B1 | * | 7/2006 | Russell et al. ................. 719/315 |
| 7,114,148 | B2 | * | 9/2006 | Irving et al. .................. 717/121 |
| 7,133,874 | B2 | * | 11/2006 | Hill et al. ..................... 707/102 |
| 7,149,730 | B2 | * | 12/2006 | Mullins et al. .................. 707/2 |
| 7,185,317 | B2 | * | 2/2007 | Fish et al. .................... 717/121 |
| 7,188,335 | B1 | * | 3/2007 | Darr et al. .................... 717/121 |
| 7,240,325 | B2 | * | 7/2007 | Keller ......................... 717/104 |
| 7,565,643 | B1 | * | 7/2009 | Sweet et al. .................. 717/121 |
| 2004/0181471 | A1 | * | 9/2004 | Rogers ......................... 705/31 |
| 2004/0237080 | A1 | * | 11/2004 | Roth ........................... 717/170 |
| 2005/0160411 | A1 | * | 7/2005 | Sangal et al. ................. 717/144 |

* cited by examiner

*Primary Examiner*—Anna Deng
(74) *Attorney, Agent, or Firm*—Finnegan, Henderson, Farabow, Garrett & Dunner, LLP (57) ABSTRACT

Methods and systems consistent with embodiments of the present invention receive information reflecting dependencies between software modules, and monitor the software modules for changes using the received information reflecting the dependencies. The information may be derived from dependency data in the software modules.

21 Claims, 6 Drawing Sheets

SYSTEMS AND METHODS FOR ENTERPRISE SOFTWARE MANAGEMENT

BACKGROUND

1. Technical Field

The present invention relates generally to software systems, and, more specifically to systems and methods for managing software.

2. Related Art

Companies face a constantly changing market, which leads to constant updating of the companies'market strategies. This impacts software usage within the companies. Software traditionally built in a monolithic manner and used within a company's intranet are moving towards more enterprise-wide service architectures and greater Internet usage. The combination of these software trends and ever-changing markets makes it important for a company to manage its software in an effective, flexible, and adaptive manner.

Accordingly, it would be beneficial to provide a system and method for managing software.

SUMMARY OF THE INVENTION

A method for managing software modules consistent with the invention comprises receiving at a computer, information reflecting dependencies between the software modules; and monitoring the software modules for changes using the received dependency information.

A system consistent with the invention comprises a memory, and a processor configured to receive information reflecting dependencies between software modules, and monitor the software modules for changes using the received information.

Both the foregoing general description and the following detailed description are exemplary and explanatory only, and should not be considered restrictive of the scope of the invention, as described and claimed. Features and/or variations may be provided in addition to those set forth herein.

BRIEF DESCRIPTION OF THE DRAWINGS

The accompanying drawings, which are incorporated in and constitute a part of this specification, illustrate several embodiments of the invention and together with the description, serve to explain principles of the invention. In the drawings.

DETAILED DESCRIPTION

The following detailed description refers to the accompanying drawings. Wherever possible, the same reference numbers in the drawings and the description refer to the same or similar parts. Although the following description identifies several features and implementations of the invention, those implementations are exemplary only, and may be modified without departing from the spirit and scope of the invention. The appended claims define the proper scope of the invention.

As discussed herein, software management is the administration, configuration, development, or any other handling of software. Software includes programs, computer applications, or any other type of data that can be received or stored. Software may be made up of software modules, such as program components, application components, or portions of executable code, computer instructions, computer data, or other electronic data. Software management may include configuring software modules, monitoring software modules, developing software modules, modifying software modules, or running software modules. Software management may also include managing hardware in association with software and software modules. Hardware may include any electronics-related, computer-related, or other types of devices capable of receiving, storing, executing, developing, using, or handling software.

Figure 1:
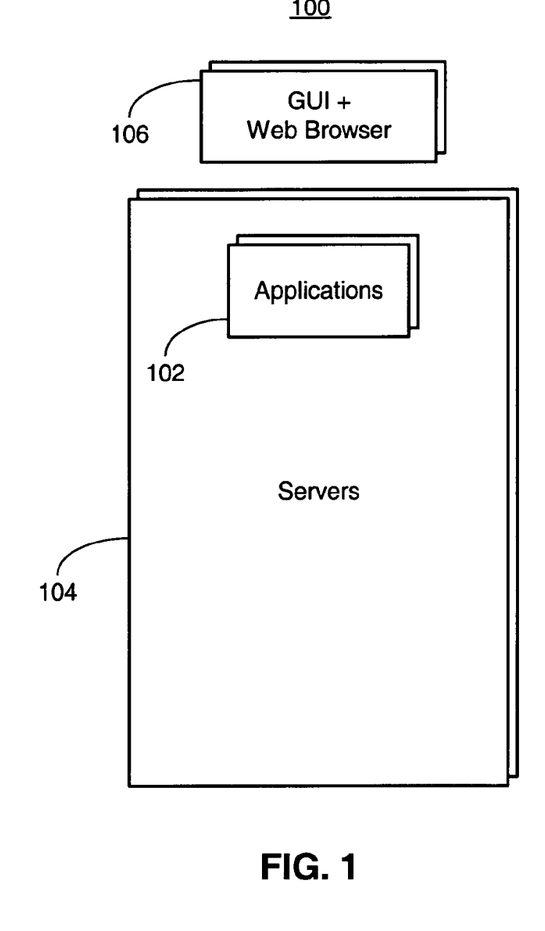
FIG. 1 is a system for carrying out methods consistent with the invention.

Traditionally, a company's system landscape consisted of monolithic systems running software with monolithic application logic. The monolithic application logic provided functions and services to a user or other entity. User interfaces, software functions, and business processes of such monolithic software were tightly integrated and developed within a single software application. For example, FIG. 1 illustrates an exemplary monolithic system 100. As shown in FIG. 1, applications 102 run on servers 104 and users access applications 102 through a graphical user interface or web browser 106. Each application 102 includes monolithic application logic running on one of servers 104.

Systems consistent with the present invention may divide application logic into multiple software modules. The software modules may include core or compound service modules, business process management modules, interaction logic modules, or other parts of the application logic. The software modules may work together to provide software services for a company. Different parts of the system may run the software modules and may be remotely located from each other. For example, multiple remote servers may run multiple software modules or portions of the software modules. One server may run a core or compound service module, another may run a business process management module, and yet another may run an interaction logic module. These software modules may work together to form an overall software application.

A core or compound service module is software for interfacing to business logic. A core service may include a fine granular interface to change an attribute of a business object in business logic. The business logic interface may be standardized and may facilitate the building of user interfaces over the business logic interface. A compound service groups calls to either core services or other compound services and may facilitate transporting data between software. Core or compound service modules may include service application modules, such as a web service. A business process management module is software for defining and implementing business processes and its management. A business process is any process in a business setting, such as for example, the process to buy a new laptop at work or to hire a new employee. Business processes may have several steps involving different people from different organizations. An interaction logic module is software for allowing users to access and use other software. Interaction logic modules may include user interfaces, such as graphical user interfaces and end user programs.

Systems consistent with the present invention may manage software modules as enterprise service architecture (ESA) components. ESA components may include software and/or hardware capable of operating in a non-monolithic system environment. Each ESA component may be part of an enterprise-wide system architecture and may provide specific services and functions to other ESA components. For example, ESA components may include one or more core or compound service modules, business process management modules, interaction logic modules, and other software modules or portions of software modules. The software modules or portions of software modules may provide services and functions to other ESA components or to each other within an ESA component. A software module or portion of a software module in an ESA component may be exchangeable with another software module or portion of a software module. For example, a core and compound service module, such as web service A, of an ESA component may be replaced by another core and compound service module, such as web service B. ESA components and software modules that use web service A may then use web service B instead.

Figure 2:
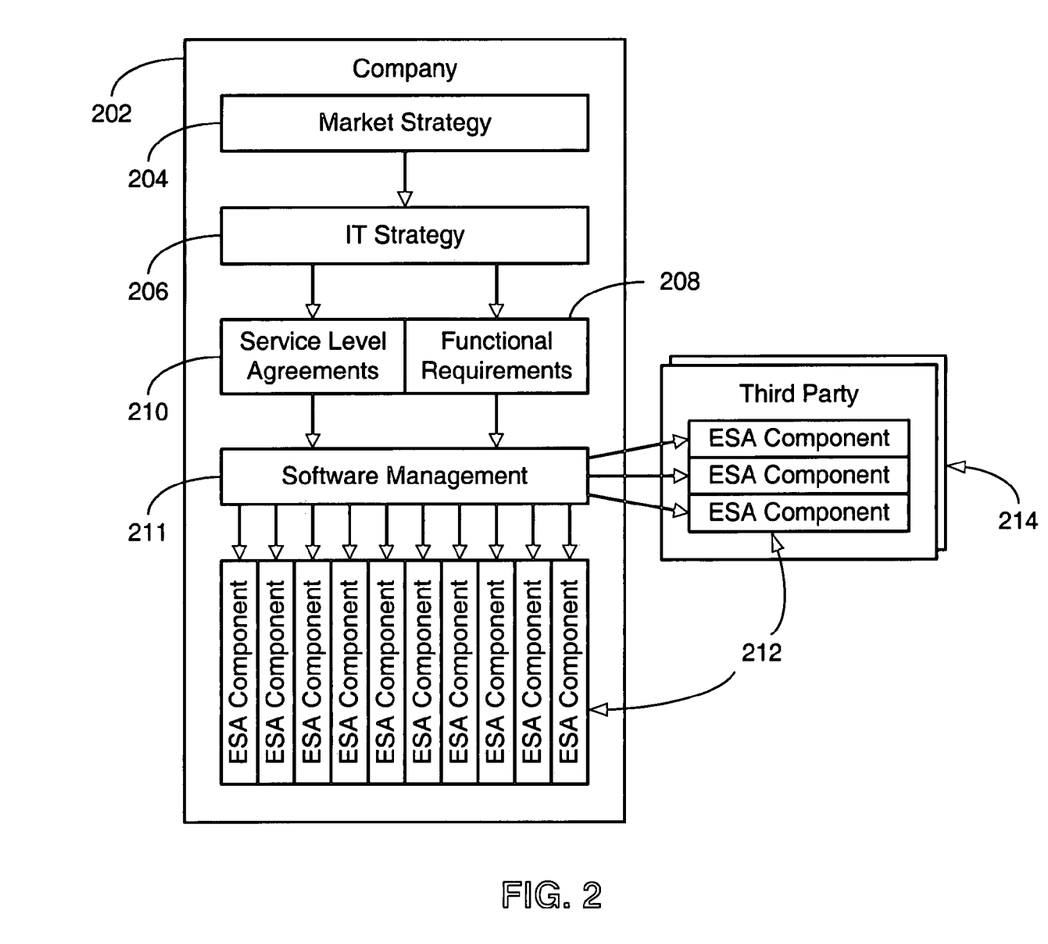
FIG. 2 is a flow chart for managing enterprise service architecture (ESA) components consistent with the invention.

FIG. 2 illustrates an exemplary flow chart for managing ESA components. As shown in FIG. 2, a company 202 may have a market strategy 204 for its business. Market strategy 204 may drive the company's information technology (IT) strategy 206. IT strategy 206 may require fulfillment of certain functional requirements 208 and may include service level agreements 210 to meet functional requirements 208. Company 202 may manage software 211 on ESA components 212 to meet functional requirements 208 and fulfill service level agreements 210. Software management 211 may include managing ESA components 212 within company 202 and managing ESA components 212 from third parties 214. As described below, company 202 may use software management systems to manage software modules, ESA components 212, and/or software modules in ESA components 212.

Although FIG. 2 illustrates an exemplary flow chart for managing ESA components consistent with the invention, other embodiments, features and principles of the present invention may also be used in non-ESA components or monolithic software. Hence, software modules within non-ESA components or monolithic software may include dependency data.

Exemplary software management systems consistent with the invention may receive information reflecting dependencies between software modules. Dependencies are relationships between software modules that the software modules or other related software rely upon to perform their functions or services. Dependencies between software modules may include dependencies between portions of software modules, such as design-time dependencies and run-time dependencies.

Design-time dependencies are dependencies between software modules known before run-time. Run-time dependences are dependencies between software modules not known until run-time. For example, a design-time dependency may be a function call that will be made by one software module to a known function in another software module. A run-time dependency may be a function call made by a software module to a function not known until the software module is executed, such as certain function calls made in Java (from Sun Microsystems, Inc. in Santa Clara, Calif.) or ABAP (from SAP, Inc. in Walldorf, Germany), which are programming languages that allow any function to be called at run-time if the address of the called function is known at run-time, regardless of whether the called function was known before run-time.

Information reflecting dependencies may be derived from dependency data in software modules. The information may be retrieved via an interface, such as an application program interface (API). A portal may be built on top of the API to access the dependency data. The portal may provide general and specific software management activities and information. The portal and the API may be used to create software management proposals and/or automate software management decisions. For example, software management systems may access dependency data in software modules via the portal and API to evaluate dependencies between the software modules. The software management systems may derive information from the dependency data and automatically determine whether proposed changes to software modules are appropriate.

Information reflecting the dependencies may be in any form, such as textual, graphical, binary, hexadecimal, or other formats. Dependency data may include any data in software modules or portions of software modules that specify relationships between the software modules or portions of the software modules. The dependency data may provide an infrastructure within software to illustrate the dependencies across an entire software solution and may specify how different pieces of the software solution interact with each other. A software solution may include multiple software applications with interrelated software modules that rely on each other's services and functions.

Dependency data may be included or embedded in software modules using automatic registration, automatic checks, product standards, or any other applicable scheme. For example, the dependency data may automatically be generated, registered, and published to a database by the underlying software infrastructure whenever software modules are changed. Automatic checks during software development may require developers to ensure software modules comply with dependency data requirements before allowing the developer to continue development. For instance, design time references in a Net Weaver Development Infrastructure (NWDI) from SAP, Inc. in Walldorf, Germany, may automatically be checked before a software module is allowed to be built and compiled. NWDI is a software configuration manager for software development and may contain a versioning repository for software files, such as java source code. NWDI may include a software building infrastructure, that creates and archives compiled code out of source code, which can be deployed, for instance, to J2EE servers. NWDI may automatically check design time references before allowing a software build. Alternatively, an automated component analysis may generate a report on software code in the software module that is not compliant with dependency data requirements. The software developer may then correct the non-compliant software code listed on the report. Product standards may define dependency data requirements for software developers to include dependency data in software modules, but may or may not automatically ensure the software modules comply with the requirements.

Exemplary dependency data may include metadata in software modules. The metadata may be embedded in source code, executable code, compiled code, or any other code of the software module. By way of example, software module A may call software module B in a session of user C, and software module B may need to run with software version D on server E. Server E may specify a location in which software module A expects to find software module B. Hence, metadata in software module A or B or software version D may specify that software module A has a dependency to server E. Further, user C may need authorization to use server E. Hence, the metadata may also indicate the user has a dependency to server E and software modules A and B in software version D.

Figure 3:
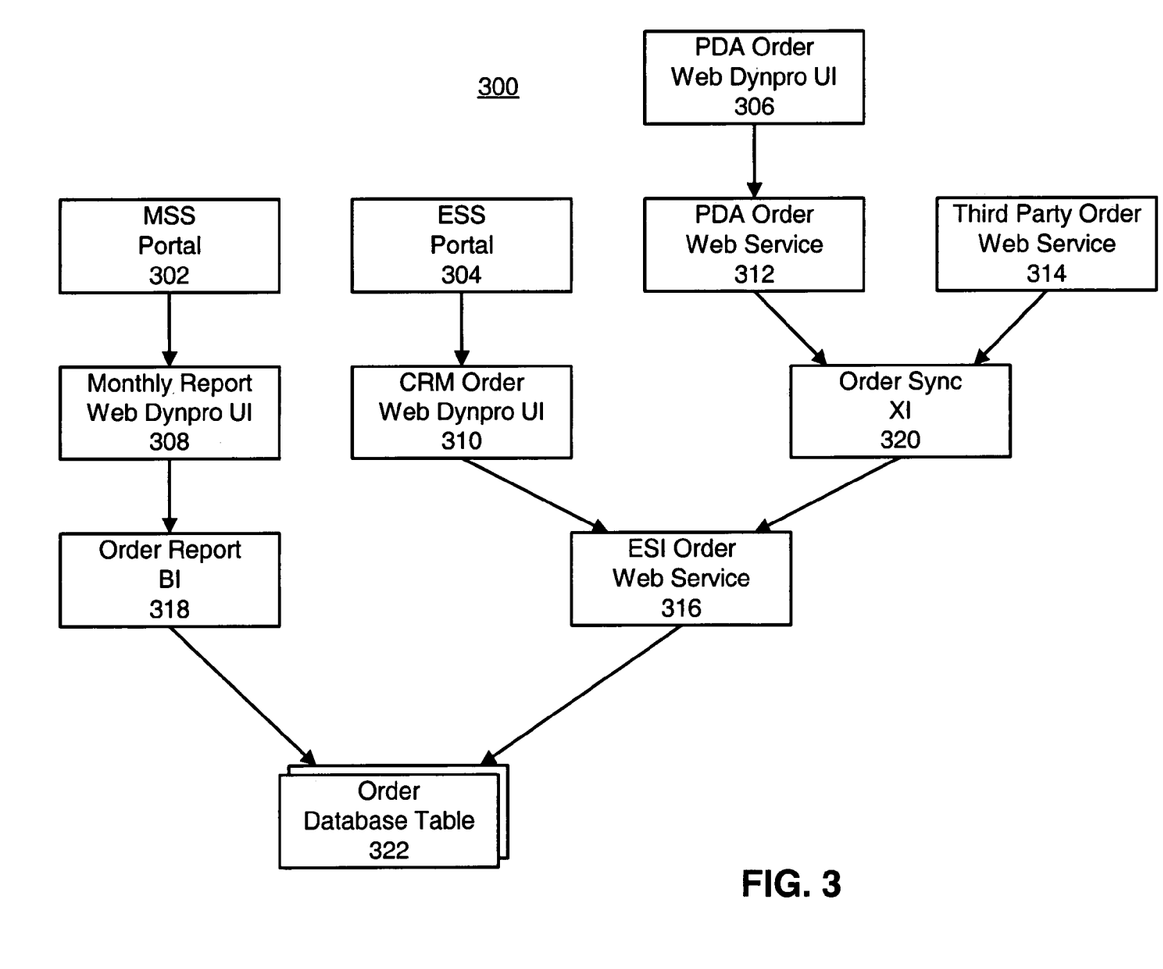
FIG. 3 is a diagram showing possible dependencies between software modules consistent with the invention.

By way of another example, FIG. 3 illustrates exemplary dependencies between software modules in a software solution. As shown in FIG. 3, software solution 300 includes portals 302 and 304, a user interface application 306-310, a web service application 312-316, a business intelligence application 318, integration software 320, and a database table 322. Each of blocks 302-322 represents software modules in software solution 300. Each software module may depend upon other software modules, for instance, by calling functions, transferring information between software modules, and/or relying on data affected by one of the software modules. Portal 302 is a software module providing a portal for manager self-services (MSS). Portal 304 is a software module providing a portal for employee self-services (ESS). User interface application 306-310 is a Web Dynpro application user interface from SAP, Inc. and includes three software modules: a personal digital assistant (PDA) user interface 306, a monthly report user interface 308, and a customer relationship management (CRM) user interface 310. Web service application 312-316 provides order services over the Internet to users and includes three software modules: a PDA order service 312, a third party order service 314, and an enterprise service infrastructure (ESI) order service 316 from SAP, Inc. Business intelligence component 318 is a software module that generates business intelligence reports, including monthly reports for orders. Integration software 320 is exchange infrastructure (XI) software from SAP, Inc. and includes a software module for synchronizing orders from PDA order service 312 and third party order service 314. Database table 322 is a software module storing order information.

Systems consistent with the present invention may monitor software modules for any change. Such systems may monitor for changes using information reflecting dependencies between software modules. Monitoring may include reviewing a software module for any change, comparing software modules to look for any change, screening a potential change to a software module, evaluating a potential change to a software module, supervising a change to a software module, or looking at a change or a potential change to a software module in any manner. A change in a software module may include replacing a software module, modifying a software module, updating a software module, removing a software module, adding a software module, reconfiguring a software module, or any other action that affects a software module or related software.

By way of example, if one wished to modify software in ESI order service 316 (FIG. 3) to add another parameter to a function or service call to ESI order service 316, one may determine that CRM user interface 310 and XI software 320 must be examined because they depend upon functions and services that ESI order service 316 provides. However, examining CRM user interface 310 and XI software 320 may not be sufficient, because CRM user interface 310 is part of the Web Dynpro user-interface application, and Web Dynpro may be integrated in other parts of a software solution. For instance, monthly report user interface 308 is another software module in the Web Dynpro user interface application. Business intelligence component 318 depends upon monthly report user interface 308 and vice versa. Hence, changes to ESI order service 316 may also affect monthly report user interface 308 and business intelligence component 318. Accordingly, information reflecting dependencies between monthly report user interface 308, CRM order user interface 310, ESI order service 316, and XI software 320 may be stored in software modules, respectively, to facilitate monitoring of any change in the software modules and ensuring that all of the relevant dependencies are known.

Systems consistent with the present invention may generate a representation of software modules according to received information. The representation may reflect dependencies between the software modules. Generating a representation may include preparing textual or graphical data to display the representation, preparing data to print a report describing or illustrating dependencies between software modules, or any other steps to organize information to create a representation reflecting dependencies between software modules.

For example, generating a representation may include organizing information reflecting dependencies into a metamodel. The metamodel may include information about system landscapes, systems in the system landscapes, applications, software modules, functionalities of software modules, companies, employees of the companies using functions and services of the software modules, and other information relevant to software management. The metamodel may include records organized to reflect dependencies between software modules, and may be used to administrate executable software in contrast with metamodels used to facilitate the development of software. Systems consistent with the present invention may embed the metamodel records or associated information in the software as metadata.

Figure 4:
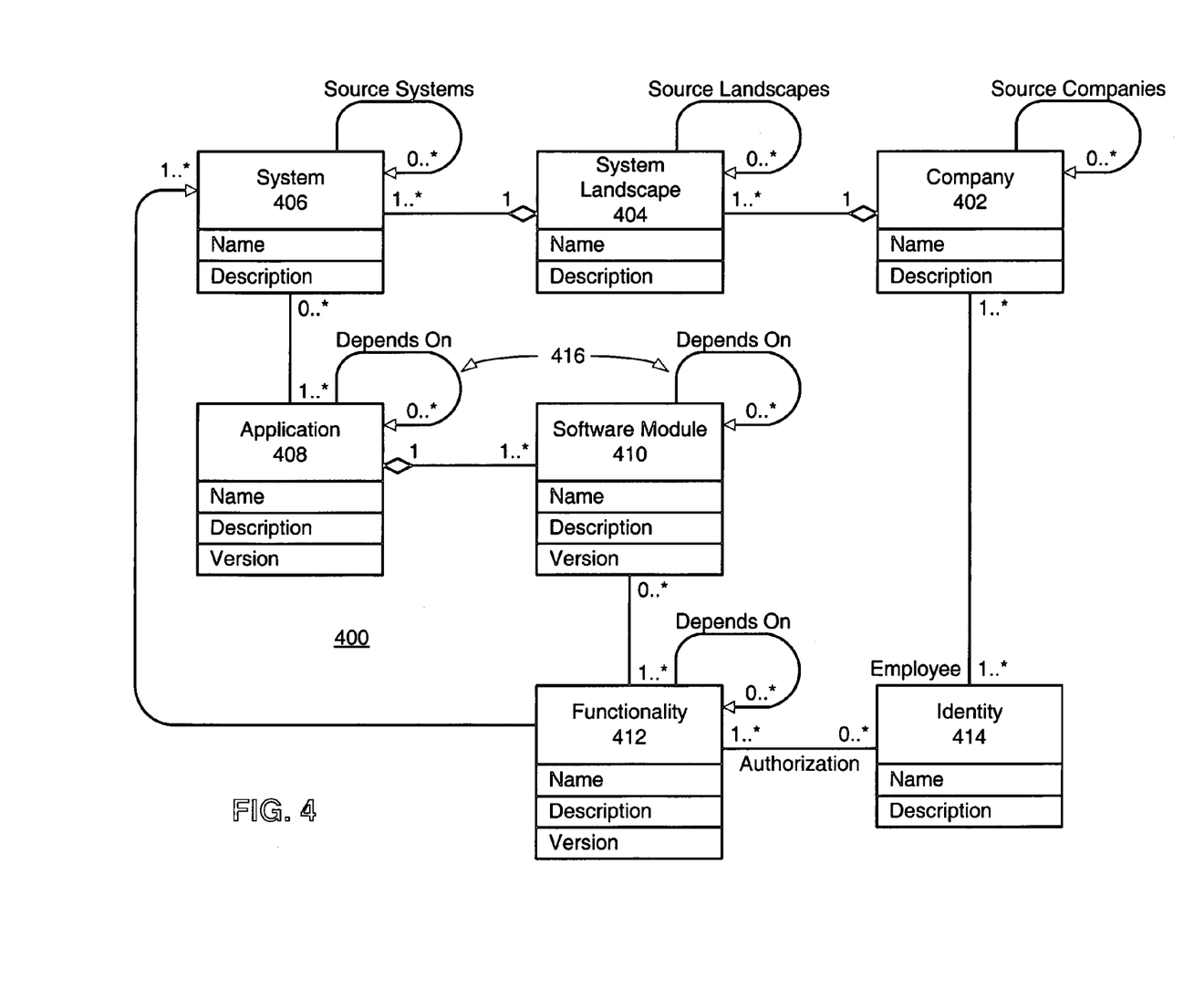
FIG. 4 is a diagram illustrating an exemplary metamodel for software management consistent with the invention.

FIG. 4 illustrates an exemplary metamodel 400. As shown in FIG. 4, metamodel 400 may include company records 402, system landscape records 404, system records 406, software application records 408, software module records 410, functionality records 412, and employee identity records 414. Each of records 402-414 may include data fields containing a name and a description of a company, system landscape, system, software application, software module, associated functionality, or employee. The descriptions may specify the roles of and describe the interactions and any dependencies between the company, system landscape, system, software application, software module, associated functionality, or employee. Each of application records 408, software module records 410, and functionality records 412 may also include version information of software associated with the record.

The organization of records 402-414 in metamodel 400 may reflect the organization and deployment of software and systems in companies and the use of functionalities in the software by employees in the companies. For example, each company record 402 may have one or more associated system landscape records 404 to represent the system landscapes in a corresponding company. Each company record 402 may have one or more employee records 414 to represent employees employed by the corresponding company. Each system landscape record 404 may have one or more associated system records 406 to represent systems within a corresponding system landscape. Each system record 406 may have zero, one, or more associated application records 408 to represent software installed or used on a corresponding system. Each system record 406 may have one or more associated functionality records 412 to represent services and functions provided by the corresponding system. Each application record 408 may have one or more associated software module records 410 to represent software modules in a corresponding software application. Each software module record 410 may have zero, one, or more functionality records 412 to represent services and functions provided by a corresponding software module. Each functionality record 412 may have zero, one, or more employee records 414 to represent authorized employees that use a corresponding function or service.

As shown in FIG. 4, application records 408, software module records 410, and functionality records 412 may include links 416 reflecting dependencies between applications, software modules, and functionalities. Link 416 may include a pointer, a reference to a record, or any other mechanism indicating a dependency existing between applications, software modules, and/or functionalities. For instance, two applications may have dependencies between each other, and link 416 may.connect application records 408 associated with the two applications to reflect the dependencies between the applications. Similarly, software modules (within one application or across multiple applications) may have dependencies between each other, and link 416 may connect software module records 410 associated with the software modules to reflect the dependencies between the software modules. Also, a function or service may be dependent upon another function or service, and link 416 may connect functionality records 412 associated with the functions or services to reflect the dependencies between the functions or services. Information associated with link 416 may characterize the dependencies between application records 408, software module records 410, and functionality records 412.

Systems consistent with the present invention may display at least a portion of a representation of software modules. Such systems may display the representation using a graphical user interface. The display may include blocks or symbols representing various software modules and connections between the software modules to illustrate dependencies between the software modules. The display may present an image reflecting or analogous to metamodel 400 in FIG. 4. Users may drill down within blocks or symbols of various software modules to obtain detailed information about the software modules, their functions, and their dependencies. If a user wishes to examine the dependencies for a particular software module of interest, the user may have the display highlight the dependencies or list software modules dependent upon the particular software module of interest.

Systems consistent with the present invention may provide a notification on any change to software monitored by the system. Such systems may provide the notification using information reflecting dependencies. The notification may include an alert, e-mail message, flag, or any other signal indicating that the software has changed. For instance, a user may update a software module in software monitored by a software management system. The system may send an e-mail message to the user or other users indicating that the software module has been updated or that software modules dependent upon the updated software module have been affected by the update. In response to the message, a user may view a display representing the software modules and their dependencies, and the display may highlight the updated software module, the affected software modules, and connections representing dependencies between the updated and affected software modules.

In one embodiment consistent with the invention, a software management system may include a component for receiving information reflecting dependencies between software modules. The information may be derived from dependency data in the software modules.

The system may also include a component for monitoring the software modules for any change, using the received information reflecting the dependencies. These components may be implemented in a system such as system 502 of FIG. 5. Any suitable combination of hardware, software, and/or firmware may be used to implement the components. The hardware, software, and/or firmware may include processors, memory, storage devices, computer-readable mediums, external communication devices, internal communication devices, display devices, input devices, output devices, etc. The aforementioned system 502 is exemplary and other systems may include the components.

Figure 5:
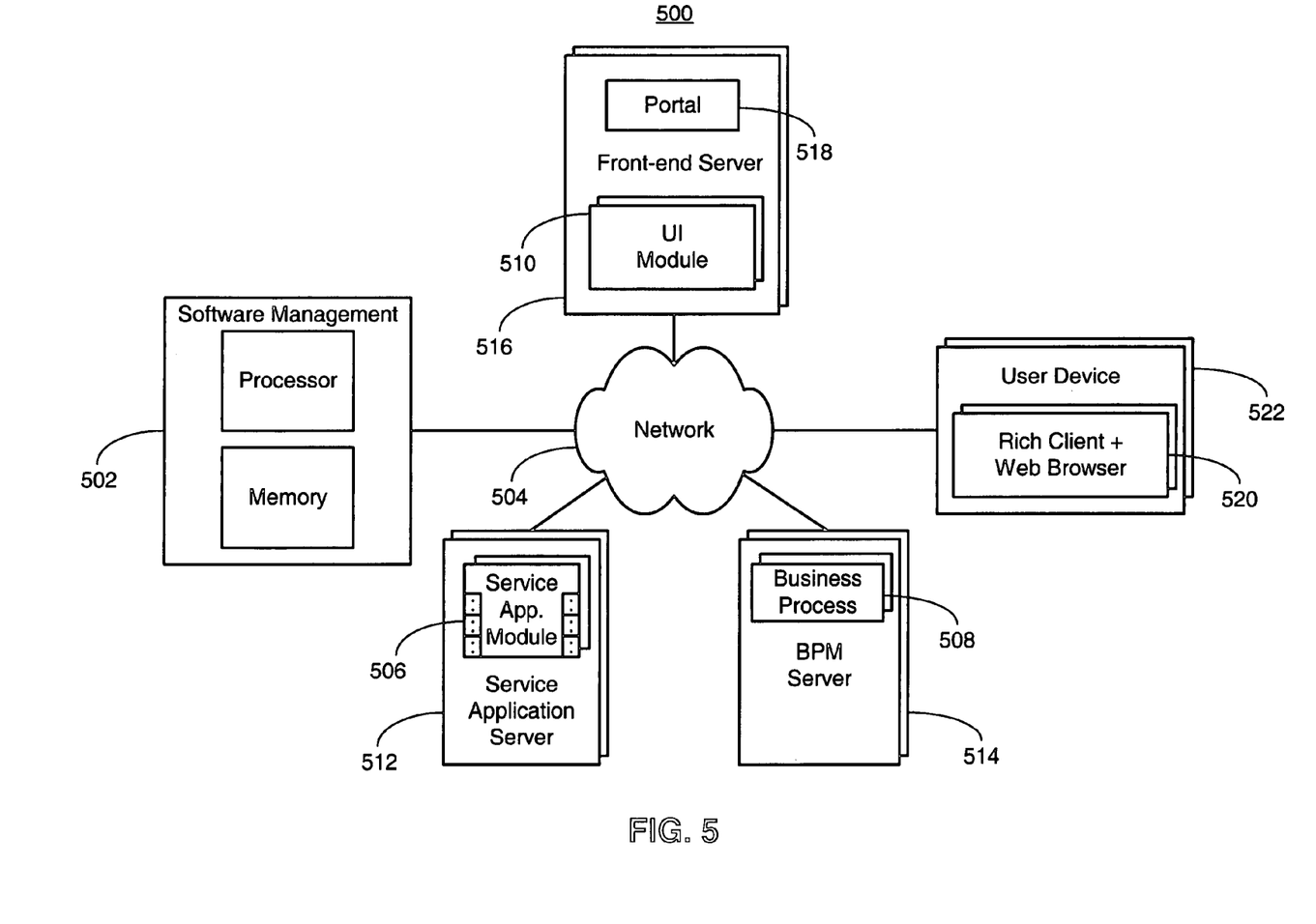
FIG. 5 is a block diagram of an exemplary enterprise service architecture consistent with the invention.

By way of example, FIG. 5 illustrates an exemplary enterprise service architecture 500 that divides applications into multiple software modules. A software manager may use software management system 502 to manage the software modules over a network 504. The software modules may include core or compound service modules, such as service application modules 506, business process management modules, such as business processes 508, or interaction logic modules, such as user interface modules 510. Software modules 506-510 may run on multiple servers, such as service application servers 512, business process management servers 514, and front-end servers 516. Users may access and use applications on servers 512-516 over network 504 through a portal 518 via web browsers 520 on user devices 522. Although FIG. 5 illustrates service application modules 506, business processes 508, and user interface modules 510 running on service application servers 512, business process management servers 514, and front-end servers 516, respectively, they may also run on the same server or a combination of servers.

Figure 6:
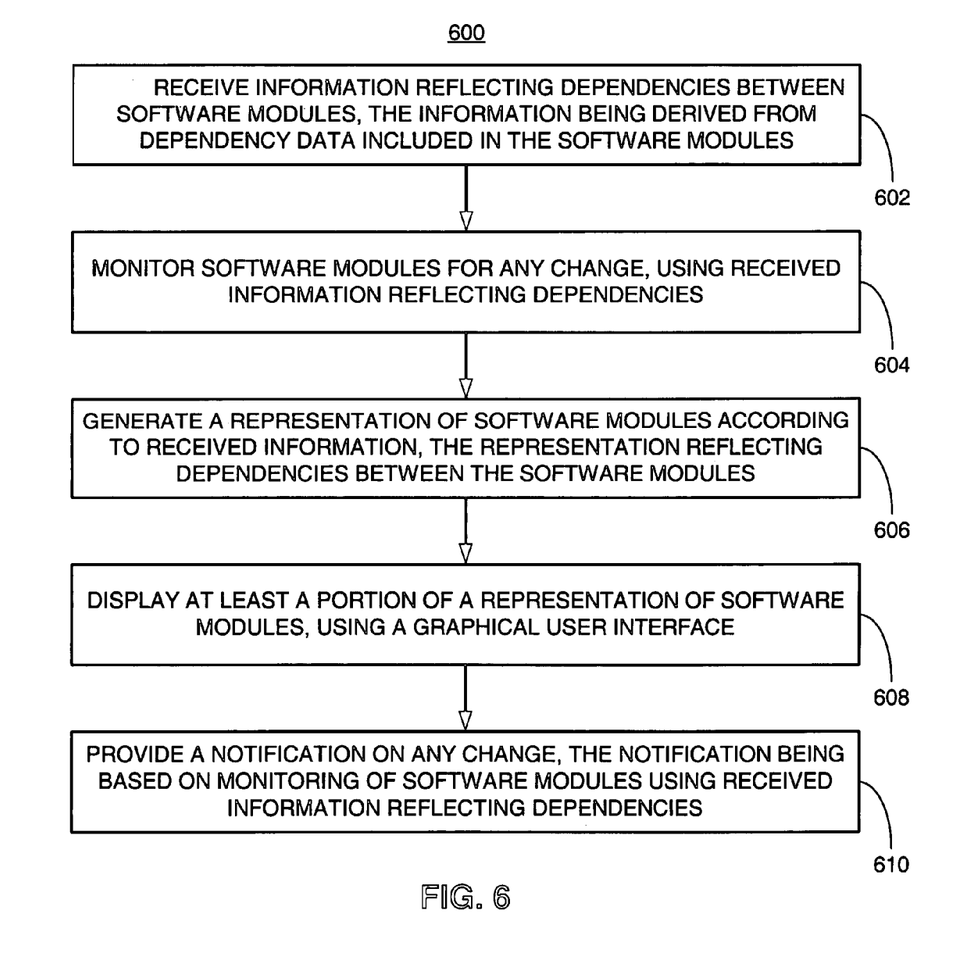
FIG. 6 is a flow diagram of a method for software management consistent with the invention.

Software management system 502 may perform a software management method 600, consistent with the invention, illustrated in FIG. 6. System 502 may include a processor, memory, and/or other components configured to implement method 600. A company may use system 502 to manage its software in an enterprise service architecture environment, such as enterprise service architecture 500. For example, system 502 may receive information reflecting dependencies between service application modules 506, business process modules 508, and UI modules 510, from servers 512-516 over network 504 (Block 602). System 502 may derive the information from dependency data in software modules 506-510, and may monitor the software modules 506-510 for any change using the received information (Block 604). System 502 may then generate a representation of software modules 506-510 according to the received information (Block 606). System 502 may include a display device and a graphical user interface (not shown) to display at least a portion of the representation (Block 608). The representation may reflect dependencies between software modules 506-510 and a software manager may examine the dependencies via the representation displayed on system 502.

When any of software modules 506-510 are changed, system 502 may provide a notification to the software manager of the change (Block 610). System 502 may also inform other users of the change via user devices 522. Using system 502, the software manager may evaluate and control the change and its effects on the software solution provided by servers 512-516.

Systems and methods consistent with the present invention may be used in many scenarios. Several examples are described above and below, but it should be understood that these examples are embodiments of the present invention. They are not intended to limit the present invention.

For example, a company may be using a third party web service to check the availability of airline flights, and may wish to extend the interface of the web service by implementing its own web service. The company's new web service might internally call the third party web service and contain some new application logic. A software developer in the company developing the new web service will need to know who else is using the third party service. The software developer may also need to check integration software, scan all relevant software code, and scan all configuration data, to evaluate the usages of the third party service by other companies. This may be prohibitively expensive, time-consuming, or difficult, and the software developer may instead have to apply a less thorough work-around by only analyzing the usages within his company. This work-around is less thorough because the software developer might not find all usages of the third party service. In short, the required dependency information is spread across an entire software solution, and the software developer can only effectively review a small portion of that.

Using an embodiment of the present invention, the software developer may access metadata within the third party service code to see all the relevant dependencies. This will provide greater efficiency and reliability.

Further, the web service may not only be used within the software developer's company, but also by customers of the company. Hence, the company may play the role of a host for the web service to its customers. In this situation, the software developer may normally create the new web service as a copy of the original service and leave the original service untouched. The developer may then declare a support period for the original service. Updates to the web service, however, might occur very often. Hence, there might need to be a repeated and regular way of declaring obsolescence and indicating the remaining support period of a web service. The software developer may include metadata in the web service code to provide this information.

Additionally, the company may wish to move portions of the web service from one hardware platform to another hardware platform. There may be dependencies between the web service and the specific configuration of the hardware platform. Also, some of the web services may need to be collocated on a single platform. Metadata in the web service software would allow one to more easily obtain that dependency information and determine how to move portions of the web service.

In one embodiment consistent with the present invention, a company may be concerned about the security of its IT systems or wish to upgrade portions of its IT systems. For instance, the company may have CRM software used by many employees. It may be important that the company be able to deactivate certain software functions in the CRM software or upgrade the CRM software to reduce the risk of security breaches. Hence, a software manager may wish to know which software modules are affected by deactivating the software services or upgrading the software. Using features and principles of one embodiment of the present invention, the software developer may access metadata within the CRM software to evaluate the consequences of deactivating the software services or upgrading the software services.

Further, the software manager may need to authorize a user for limited use of portions of the CRM software. The software manager may need to know which pieces of CRM software are used by users in specific roles and may need to scan the entire software solution to obtain this information. Metadata in the CRM software may simplify this by providing user role and functionality information within portions of the code.

In one embodiment consistent with the present invention, security and authorization functions in the CRM software and other software applications may be spread across an entire software solution. Each software application in the software solution may include its own security and authorization code to control access to the software application. This makes it difficult to manage security in the software. Software developers may use a central authorization software module in the software solution to manage all of the security and authorization functions in the software solution. This, however, leads to a problem of ensuring workability between the central authorization software module and the other software applications in the solution. Dependency data in the central authorization software module and/or other software modules in the software solution would facilitate use of the central authorization software module. Software developers may rely on information derived from the dependency data to maintain the overall software solution and component parts of the software solution, without needing to worry that a change to one part of the solution would adversely impact another part via the central authorization software module.

The foregoing disclosure only describes some of the features and embodiments of the invention. Those skilled in the art, however, will understand other features and embodiments from consideration of the specification and practice of the embodiments of the invention disclosed herein. For example, although the described embodiments use data stored in memory and other storage media, one skilled in the art will appreciate that other types of computer-readable media, such as secondary storage devices, like hard disks, floppy disks, or a CD-ROM, or other forms of RAM or ROM, can contain the data. Further, the steps of the disclosed methods may be modified in any manner, including by reordering steps and/or inserting or deleting steps, without departing from the principles of the invention. The specification and examples are thus only exemplary only, as the following claims and their equivalents set forth the scope of the invention.

What is claimed is:

1. A method for managing software modules comprising:
receiving, at a computer, dependency information reflecting dependencies between the software modules, wherein the dependency information is included in the software modules and specifies a dependency between a user and at least one of the software modules based on an authorization of the user to use the at least one software module;
monitoring the software modules to obtain updates to the dependencies from the received dependency information;
generating a representation of the software modules according to the received dependency information, the representation reflecting the dependencies between the software modules;
receiving data reflecting a software development change to a first one of the software modules;
providing notification of the software development change to third-party users of the software modules by transmitting an e-mail message to the third party users, the e-mail message containing data indicating affected software modules dependent on the software development change; and
performing, by the computer, design-time checks to determine whether the software development change to the first one of the software modules is consistent with the updated dependencies between the software modules reflected by the received dependency information, wherein the design-time checks are automatically performed before the first one of the software modules is compiled with the software development change.

2. The method of claim 1, further comprising displaying at least a portion of the representation.

3. The method of claim 1, further comprising providing a notification of changes based on the monitoring.

4. The method of claim 1, further comprising providing a portal to access the received dependency information and additional software management information.

5. The method of claim 1, wherein the dependency information is accessed by the computer using an Application Program Interface (API).

6. The method of claim 1, wherein monitoring comprises:
evaluating the change according to the received dependency information reflecting the dependencies; and
generating a software management proposal.

7. The method of claim 1, wherein the dependencies comprise runtime dependencies.

8. The method of claim 1, further comprising ensuring the software modules comply with policies for including dependency information in the software modules to enable the computer to derive the dependencies between the software modules.

9. A system comprising:
a memory, and
a processor configured to:
receive dependency information reflecting dependencies between software modules, wherein the dependency information is included in the software modules and specifies a dependency between a user and at least one of the software modules based on an authorization of the user to use the at least one software module;
monitor the software modules to obtain updates to the dependencies from the received dependency information;
generate a representation of the software modules according to the received dependency information, the representation reflecting the dependencies between the software modules;
receive data reflecting a software development change to a first one of the software modules;
provide notification of the software development change to third-party users of the software modules by transmitting an e-mail message to the third party users, the e-mail message containing data indicating affected software modules dependent on the software development change; and
perform design-time checks to determine whether the software development change to the first one of the software modules is consistent with the updated dependencies between the software modules reflected by the received dependency information, wherein the design-time checks are automatically performed before the first one of the software modules is compiled with the software development change.

10. The system of claim 9, further comprising a display on which the processor displays at least a portion of the representation, using a graphical user interface.

11. The system of claim 9, wherein the processor further provides a notification of changes based on the monitoring.

12. The system of claim 9, wherein the processor further provides a portal to access the received dependency information and additional software management information.

13. The system of claim 9, wherein the processor accesses the dependency information through an Application Program Interface (API).

14. The system of claim 9, wherein the processor evaluates the changes in the software modules using the received dependency information reflecting the dependencies, and generates a software management proposal.

15. The system of claim 9, wherein the dependencies comprise runtime dependencies.

16. The system of claim 9, wherein the processor further ensures the software modules comply with policies for including dependency information in the software modules enable the processor to derive the dependencies between the software modules.

17. A computer-readable medium comprising instructions to configure a computer to implement a method comprising:
receiving dependency information reflecting dependencies between software modules, wherein the dependency information is included in the software modules and specifies a dependency between a user and at least one of the software modules based on an authorization of the user to use the at least one software module;
monitoring the software modules to obtain updates to the dependencies from the received dependency information;
generating a representation of the software modules according to the received dependency information, the representation reflecting the dependencies between the software modules;
receiving data reflecting a software development change to a first one of the software modules;
providing notification of the software development change to third-party users of the software modules by transmitting an e-mail message to the third party users, the e-mail message containing data indicating affected software modules dependent on the software development change; and
performing design-time checks to determine whether the software development change to the first one of the software modules is consistent with the updated dependencies between the software modules reflected by the received dependency information, wherein the design-time checks are automatically performed before the first one of the software modules is compiled with the software development change.

18. The method of claim 1, wherein the dependency information comprises information on a user role for at least one of the software modules.

19. The method of claim 9, wherein the dependency information comprises information on a user role for at least one of the software modules.

20. The method of claim 1, further comprising:
preventing a software build of the first software module when the software development change to the first one of the software modules is inconsistent with the received dependency information.

21. The method of claim 1, further comprising:
generating a report when the software development change to the first one of the software modules is inconsistent with the received dependency information, the generated report reflecting the inconsistency.

* * * * *